(12) United States Patent
Cotter (10) Patent No.: US 9,046,146 B2
(45) Date of Patent: Jun. 2, 2015

(54) GAS SPRING AND GAS SPRING COMPONENTS

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 55 days.

(21) Appl. No.: 13/752,733

(22) Filed: Jan. 29, 2013

(65) Prior Publication Data

US 2013/0207326 A1 Aug. 15, 2013

Related U.S. Application Data

(60) Provisional application No. 61/598,733, filed on Feb. 14, 2012.

(51) Int. Cl.
| F16F 13/00 | (2006.01) |
| F16F 9/02 | (2006.01) |
| F16F 9/32 | (2006.01) |
| F16F 9/58 | (2006.01) |
| F16F 9/48 | (2006.01) |

(52) U.S. Cl.
CPC ............. *F16F 13/002* (2013.01); *F16F 9/02* (2013.01); *F16F 9/3221* (2013.01); *F16F 9/585* (2013.01); *F16F 9/48* (2013.01); *F16F 9/0218* (2013.01)

(58) Field of Classification Search
CPC ........... F16F 7/12; F16F 7/123; F16F 9/0218; F16F 9/362

USPC .......... 188/371, 377; 267/137, 119, 124, 130
See application file for complete search history.

(56) References Cited

U.S. PATENT DOCUMENTS

| 2,642,845 | A | * | 6/1953 | Stevens ........................... 91/395 |
| 4,139,182 | A | * | 2/1979 | Nagase et al. ................ 267/120 |
| 4,527,674 | A | * | 7/1985 | Mourray ...................... 188/284 |
| 4,742,997 | A | * | 5/1988 | Wallis .......................... 267/119 |
| 5,088,698 | A | * | 2/1992 | Wallis .......................... 267/119 |
| 5,303,906 | A |   | 4/1994 | Cotter et al. |
| 5,728,174 | A | * | 3/1998 | Fitzlaff ........................... 623/46 |
| 6,793,398 | B2 | * | 9/2004 | Nahrwold et al. ............ 384/563 |
| 7,389,860 | B2 | * | 6/2008 | Abu-Odeh et al. ........... 188/377 |
| 7,559,542 | B2 |   | 7/2009 | Cotter |
| 7,963,378 | B2 | * | 6/2011 | Glance et al. ................. 188/377 |
| 2009/0072453 | A1 |   | 3/2009 | Cotter et al. |

OTHER PUBLICATIONS

Salehghaffari, S. et al., Analysis and Optimization of Externally Stiffened Crush Tubes, Elsevier Ltd., Thin-Walled Structures, 49 (2011), pp. 397-408.

* cited by examiner

*Primary Examiner* — Xuan Lan Nguyen
(74) *Attorney, Agent, or Firm* — Reising Ethington P.C.

(57) ABSTRACT

A gas spring for forming equipment, a piston rod for the gas spring, and a shock collar for the gas spring carried by the piston rod. The shock collar may be resiliently flexible, and plastically deformable so as to at least partially collapse, and the piston rod may include features to disrupt a gas spring seal upon at least partial collapse of the shock collar.

19 Claims, 6 Drawing Sheets

GAS SPRING AND GAS SPRING COMPONENTS

This application claims the benefit of U.S. Provisional Application No. 61/598,733, filed Feb. 14, 2012.

TECHNICAL FIELD

This invention relates generally to spring devices, and more particularly to a gas spring for forming equipment.

BACKGROUND

Gas springs are well known and have been used in dies of presses for sheet metal stamping operations. For example, gas springs can be used as press cushions, among many other types of applications. Conventional gas springs have a gas chamber which receives a pressurized gas (typically nitrogen at a pressure of 1,500 to 3,000 PSI) that provides a force on a piston and a solid piston rod which carries the piston to bias them to an extended position. The pressurized gas resists the movement of the piston and the piston rod from their extended position to a retracted position. Various housings and seals are provided in the gas spring to retain the piston and piston rod within a casing of the gas spring and to prevent leakage of the pressurized gas from the gas chamber.

SUMMARY

In at least one implementation, a gas spring for forming equipment includes a casing, a piston rod housing received at least in part in the casing, and a piston rod received at least in part in the casing and extending through the piston rod housing for reciprocation between extended and retracted positions over a cycle of the gas spring including a retraction stroke and an extension stroke. The piston rod includes a body extending out of the casing through the housing and having an outer axial end of the piston rod disposed outside of the casing, and a head at an inner axial end of the piston rod. The gas spring also includes a shock collar carried by the piston rod at an axial location along the piston rod between the piston rod head and the piston rod housing, wherein the shock collar surrounds a portion of the piston rod, is axially spaced from the housing in the retracted position of the rod, and engages the housing in the extended position of the rod, and wherein the shock collar includes a collapsible portion that is flexible and axially displaceable, and a mounting portion extending axially from the collapsible portion and mounted to the piston rod.

In another implementation, a gas spring shock collar includes a collapsible portion having an impact surface, and corrugations including axially alternating annular projections including at least one radially outer annular projection at least partially establishing a radially outer profile of the shock collar and at least one radially inner annular projection at least partially establishing a radially inner profile of the shock collar. The shock collar also includes a mounting portion extending axially from the collapsible portion, at least partially establishing the radially outer profile of the shock collar, and including a radially inner mounting surface and an axially facing mounting surface adjacent the radially inner mounting surface.

In another implementation, a gas spring piston rod includes a body including a first end of the piston rod, and having a cylindrical outer surface, a head disposed at a second end of the piston rod, and having a radially outer profile radially larger than the cylindrical outer surface of the body, and a neck axially disposed between the body and the head. The neck has a radially outer profile radially larger than the cylindrical outer surface of the body, an annular relief axially adjacent the radially outer surface of the body, wherein the annular relief is radially smaller than the cylindrical outer surface of the body, and at least one vent passage extending transversely through the piston rod and intersecting the annular relief.

Some potential objects, features and advantages of the gas spring and/or its components set forth herein include providing a device that is readily usable with a wide range of forming equipment, readily permits use of common components among gas springs of different configuration and construction, can be easily serviced and its components replaced as needed, can be used in a wide range of applications having different size and force requirements, is readily adaptable to a wide range of press configurations, reduces sudden impact at return to full extension of the gas spring to reduce stress on the gas spring, and is of relatively simple design, economical manufacture and assembly, is robust, durable, reliable and in service has a long useful life. Of course, an apparatus embodying the present invention may achieve, none, some, all or different objects, features or advantages than those set forth with regard to the illustrative embodiments disclosed herein.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figure 1:
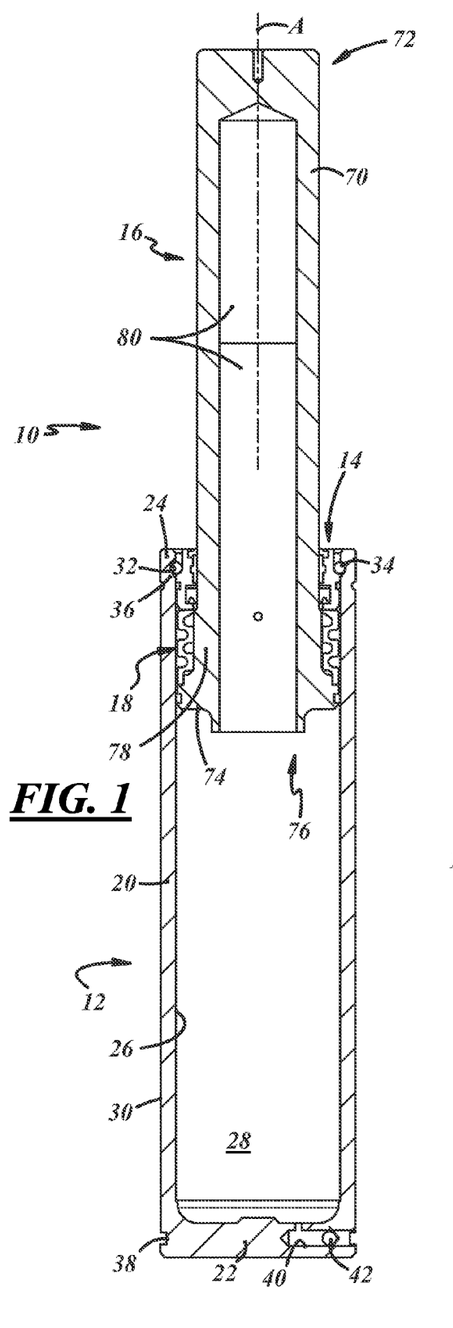
FIG. 1 is a sectional view of an illustrative embodiment of a gas spring with a piston rod carrying a shock collar and shown in its extended position.
Figure 2:
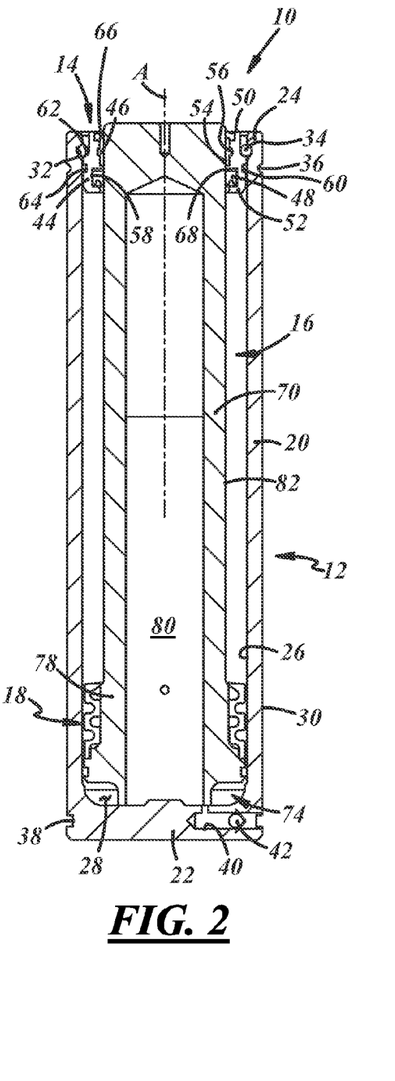
FIG. 2 is a view similar to FIG. 1, showing the piston rod in its retracted position.

Referring in more detail to the drawings, FIGS. 1 and 2 illustrate one presently preferred embodiment of a gas spring 10 that may be used in forming equipment, for example, sheet metal stamping dies and mechanical presses (not shown). In general, the gas spring 10 may include a casing 12, a guide and seal assembly 14 carried by the casing 12, a piston rod 16 carried by the casing 12 and extending through the guide and seal assembly 14, and a shock absorbing collar or shock collar 18 carried by the piston rod 16.

One or more of the gas springs 10 may be used in various implementations in forming equipment to provide a moveable component or support of a forming die or a workpiece with a yielding force or a return force. For example, in a binder ring implementation, the gas spring 10 may provide a yielding force against a binder ring of a forming die to hold a metal workpiece while another part of the forming die forms, cuts, stretches, or bends the workpiece. In a lifter implementation, the gas spring 10 may provide a yielding force and return force to lift a workpiece off a surface of the forming die or to otherwise maintain control of the workpiece. In a cam tool implementation, the gas spring 10 may apply a yielding force to return a cam-activated tool to its home position. Of course, the gas spring 10 may be used in a wide range of other implementations.

The casing 12 may include a side wall 20 that may terminate axially at a closed end 22, and at an open end 24 that receives the guide and seal assembly 14 and the piston rod 16 therein. The closed end 22 may be a separate component attached to the side wall 20, for example by a weld joint, or may be integrally produced with the side wall 20. The side wall 20 of the casing 12 has an inner surface 26 defining at least in part a gas chamber 28, and an outer surface 30. The casing 12 may be of generally cylindrical shape, for example, wherein at least one of the inner or outer surfaces 26, 30 is cylindrical. The inner surface 26 of the side wall 20 may have a circumferential retainer groove 32 constructed for receipt of a retainer, shown here by way of example as a snap ring 34, to maintain the gas spring 10 in its assembled state. To facilitate mounting and locating the gas spring 10 within a press, a pair of longitudinally spaced circumferential grooves 36, 38 may be machined, formed, or otherwise provided in the outer surface 30 of the casing 12 adjacent its ends 22, 24. To admit gas into the gas spring 10, the casing 12 may include a passage or fill port 40 that may be provided through the closed end 22 of the casing 12 in any suitable manner. A fill valve 42 may be received in the fill port 40, for instance, to act as a one way valve and allow gas to be admitted into the gas spring 10, while preventing the gas from unintentionally exiting the gas spring 10. The fill valve 42 may be opened to release pressurized gas from within the gas spring 10, when desired.

The guide and seal assembly 14 is disposed at least in part in the casing 12 at the open end 24 of the casing 12, and includes a piston rod housing 44, a guide bushing 46 carried by the housing 44, and a rod seal 48 carried by the housing 44. The housing 44 may include an outer axial end 50, an inner axial end 52, a piston rod through bore 54 extending between the ends 50, 52, a bushing groove 56 in the bore 54, a seal groove 58 in the bore 54, and an outer surface 60. The housing 44 may be of generally cylindrical shape, for example, wherein the through bore 54 is of cylindrical profile and the outer surface 60 may be of cylindrical profile. The guide bushing 46 may be disposed in the bushing groove 56 of the housing 44, may be composed of any suitable low friction material, and may be sized to slidably engage the piston rod 16 to guide the piston rod 16 for axial reciprocation within the casing 12. The rod seal 48 may be disposed in the seal groove 58 of the housing 44 and sealingly engages the piston rod 16.

The guide and seal assembly 14 may be sealingly coupled to the casing 12. For example, a shoulder 62 in the outer surface of the housing 44 may cooperate with the snap ring 34, and a casing seal 64 may be disposed between the housing 44 and the inner surface 26 of the casing 12, for instance, in a groove in the outer surface 60 of the housing 44. The assembly 14 also may include a wiper 66 that may be carried in a wiper groove of the through bore 54 at the outer axial end 50 of the housing 44, and a seal support ring 68 that may be carried in the rod seal groove 58 axially between the rod seal 48 and the guide bushing 46.

The piston rod 16 is disposed at least in part in the casing 12 and through the guide and seal assembly 14 for reciprocation along an axis A between extended and retracted positions over a cycle of the gas spring 10 including a retraction stroke and an extension or return stroke. The piston rod 16 is acted on by gas in the gas chamber 24 to bias the piston rod 16 toward an extended position (FIG. 1) and away from a retracted position (FIG. 2).

The piston rod 16 includes a body 70 extending out of the casing 12 through the through bore 54 of the guide and seal assembly housing 44 and including a first or outer axial end 72 engageable with a ram or other portion of a press, a die component, or other piece of forming equipment (not shown), a head 74 disposed in the casing 12 at a second or inner axial end 76 of the piston rod 16, and a neck 78 between the head 74 and the body 70. The piston rod 16 also includes an internal cavity 80 extending from the inner axial end 76 of the piston rod 16 toward the outer axial end 72 of the piston rod 16. The internal cavity 80 may be centrally radially located and may extend for larger than 80% of the overall length of the piston rod 16. The body 70 also includes a cylindrical outer surface 82 in sealing engagement with the rod seal 48 and in sliding engagement with the piston rod bushing 46 for guided relative movement between the extended and retracted positions.

Figure 3:
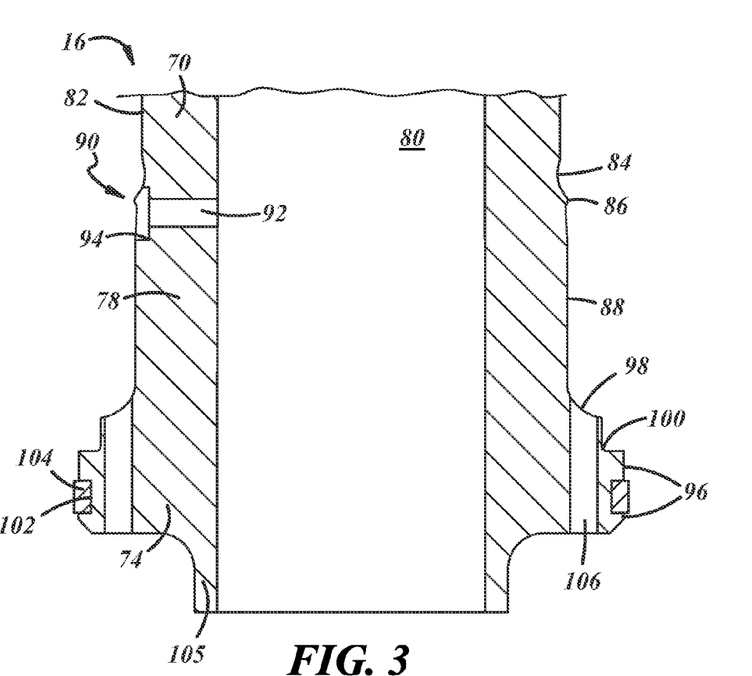
FIG. 3 is an enlarged fragmentary sectional view of a portion of the piston rod of FIGS. 1 and 2.

Referring to FIG. 3, the piston rod neck 78 includes a radially outer profile that may be cylindrical, and may be larger in a radial direction relative to the piston rod body 70. Also, the head 74 may include a radially outer profile that may be cylindrical, and may be larger in a radial direction than the neck 78 and the cylindrical outer surface 82 of the body 70. The neck 78 may include an annular relief 84 axially adjacent the body 70, an annular projection 86 axially adjacent the relief 84, and a cylindrical collar journal 88 extending axially between the projection 86 and the head 74 and having an enlarged diameter relative to the cylindrical outer surface 82 of the body 70. The annular relief 84 is smaller in a radial direction than the cylindrical outer surface 82 of the body 70.

The piston rod neck 78 also may include one or more vent passages 90 extending through the piston rod 16 in a direction that is transverse with respect to the axis A, from the interior to the exterior thereof. The vent passage 90 may include a through bore 92, and a counterbore 94 in the exterior surface of the piston rod 16. The vent passage 90 may be located so as to overlap or extend through the annular relief 84 and/or the annular projection 86. For example, the counterbore 94 may interrupt the annular relief 84 and the annular projection 86.

The piston rod head 74 may include a casing journal 96 having an enlarged diameter relative to the collar journal 88, and a fillet 98 and a step 100 between the journals 88, 96. The casing journal 96 may include a guide bearing groove 102 in which a piston guide bearing 104 may be disposed for guiding the piston rod 16 within the casing 12. The piston guide bearing 104 may be a split bearing or the like to allow passage of some gas therethrough. The head 74 also may include an annular axial extension 105 that may cooperate with the closed end 22 of the casing 12, for example, to limit travel of the piston rod 16. The head 74 further may include one or more head vents 106 that may extend axially therethrough and may overlap or extend through the fillet 98 to ensure good gas flow and reduce heating.

Figure 4:
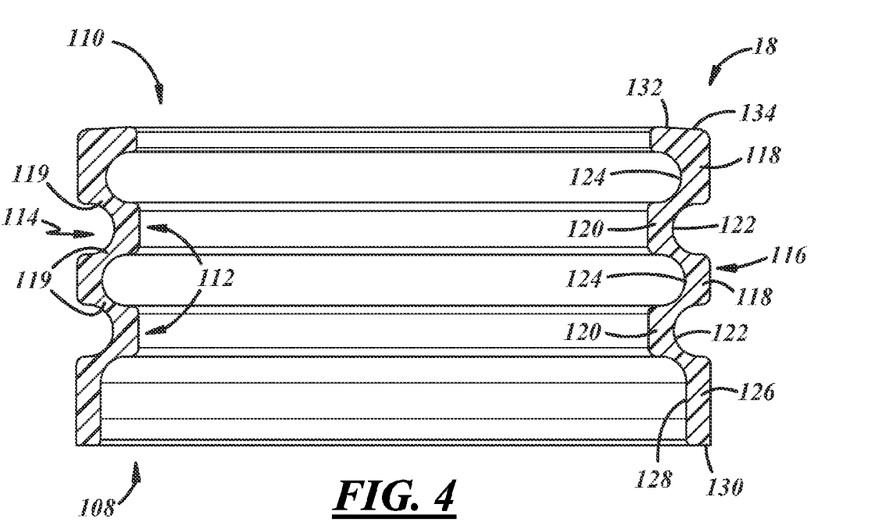
FIG. 4 is an enlarged sectional view of the shock collar of FIGS. 1 and 2.

Referring to FIG. 4, the shock collar 18 may include a head end 108 that may contact a portion of the piston rod head 74 (FIG. 3), and a housing end 110 that may contact a corresponding axial end or surface of the guide and seal housing 44 (FIG. 1). The shock collar 18 also may include a radially inner profile 112 surrounding the piston rod 16, and a radially outer profile 114 surrounded in assembly by the casing 12 (FIG. 1). The shock collar 18 may include a collapsible portion that may be flexible and axially displaceable. As used herein, the term collapse includes partial or complete collapse. In any event, the geometry of the collar 18 may be such that movement of the piston rod 16 is allowed to such a degree so as to destroy and or vent the rod seal 48 before the mass of the collar 18 has plastically yielded to completion, during collapse of the shock collar 18.

In one implementation, the collapsible portion of the shock collar 18 may be at least partially corrugated. For instance, the shock collar 18 may include a side wall 116, including at least a portion of which that is corrugated. Corrugations may include one or more radially outer annular wall portions or projections 118 and one or more radially inner annular wall portions or projections 120 axially alternating with the radially outer annular projections 118. Accordingly, the inner projections 120 are axially spaced from the outer projections 118. The inner projections 120 may have rounded outer surfaces 122 and the outer projections 118 may have rounded inner surfaces 124. The rounded surfaces 122, 124 may provide generally transversely extending annular segments 119 interconnecting the axially adjacent inner and outer projections 118, 120. The projections 118, 120 may be circumferentially continuous. The projections 118, 120 may have any suitable cross-sectional shape.

Also, the side wall 116 may include a mounting portion that extends axially from the collapsible portion, at least partially establishes the radially outer profile of the shock collar 18, and also may include a cylindrical portion 126 at the head end 108 of the shock collar 18. The cylindrical portion 126 may include a radially inner cylindrical mounting surface 128 that may be sized for an interference fit with the step 100 of the piston rod head 74 (FIG. 3), and also may include an axially facing end mounting surface 130 adjacent the radially inner mounting surface 128 that may axially locate the shock collar 18 against the piston rod 16.

The housing end 110 of the shock collar 18 may include an impact surface 132 and a radially outwardly adjacent angled surface 134 that may be angled in a direction that is radially outward inclined toward the end 108 and axially away from the end 110. The angle may be of any suitable magnitude. For example, the angle may be about 5 degrees, for instance, from 2 to 10 degrees.

Referring again to FIG. 1, in any implementation, the shock collar 18 may be of any suitable configuration, construction, and/or composition such that upon the piston rod 16 exceeding a predetermined velocity during its extension stroke, the shock collar 18 is flexible and displaceable in an axial direction between the piston rod head 74 and the guide assembly housing 44. The shock collar 18 may be collapsible to permit a portion of the piston rod 16 to disrupt sealing engagement between the piston rod 16 and the rod seal 48 and thereby allow discharge of compressed gas past the rod seal 48. For example, the shock collar 18 may be configured, constructed, and/or composed in a manner in which: 1) it repeatedly deforms elastically (or is resilient and flexible) and returns to its free form shape under normal operating conditions of the gas spring; but 2) it deforms plastically (or is plastically deformable) wherein some portion of its deformation is permanent when its yield point is exceeded. The yield point may be exceeded, for example, because a predetermined or maximum allowable velocity of or force produced by the piston rod is exceeded just before impact of the shock collar 18 with the housing 44. The reaction of the shock collar 18 may be proportional to the degree by which the maximum allowable velocity is exceeded. For example, a minor violation of the speed limit (e.g. from 2 m/s to 3 m/s) may cause some limited deformation over time but may not be significant enough to cause the gas spring to discharge by destruction of the seal 58.

The shock collar 18 may surround a portion of the piston rod 16 at an axial location along the piston rod 16 between the head 74 and the housing 44 of the guide and seal assembly 14. The shock collar 18 may be axially spaced from the housing 44 in the retracted position of the piston rod 16 (FIG. 2), and may engage the housing 44 in the extended position of the piston rod 16 (FIG. 1). For example, the housing end 110 (FIG. 4) of the shock collar 18 may engage the corresponding axial end of the housing 44.

With the housing 44 sealingly coupled to the casing 12, and with the piston rod 16 received in the casing 12 and guided and sealed by the housing 44, the spring 10 may be charged with a gas through the fill port 40 in the casing 12. The pressurized gas yieldably biases the piston rod 16 to its extended position wherein the shock collar 18 is engaged between, and compressed by, the piston rod head 74 and the housing 44.

In one illustrative implementation, a plurality of the charged gas springs 10 may be received in a die assembly with a workpiece clamp ring or binder ring resting on the axial outer ends of the extended piston rods. The die assembly may be received in a press with one die attached to a bed of the press, while another die is attached to a ram of the press. As the ram is advanced from its fully retracted position, the clamp ring is urged by the gas springs into engagement with a metal blank workpiece to be formed. The piston rod 16 of each such gas spring 10 is initially retracted under the ram force as the dies are moved toward their fully closed position to form the blank workpiece into a formed part. As such, when the gas spring piston rods are initially retracted by press operation, the impact force on the press ram is reduced as a result of the assistance from the spring force offered by the shock collar 18 between the housing 44 and the piston rod head 74. In addition, as the press ram moves back toward its fully retracted position, the impact force on the press is reduced by the gradual loading of the shock collar 18 as its becomes compressed between the piston rod head 74 and the housing 44. As such, the load imparted on the press takes place over a smooth load curve, rather than a sudden spike. The reduced impact force upon the press and its associated components over a complete cycle of the press may reduce wear, damage, noise and vibration within the gas spring and/or press.

A spring rate of the shock collar 18 can be altered by changing the specific configuration, construction, and/or composition of the shock collar 18, as desired. The effective static spring force in use may be equal to the net force on the piston rod 16 from the pressurized gas, and in some applications may be, for example, 2,000-60,000 pounds. Deflection of the shock collar 18 under normal operating conditions of the gas spring 10 may be less than one millimeter (0.0393 inches). For example, the shock collar 18 may deflect about 0.002-0.008 inches at static loads of about 2,000-60,000 pounds of force (lb-f), and may deflect about 0.005-0.015 inches at dynamic loads of about 4,000-120,000 lb-f. The dynamic loads may correspond to a return velocity of the piston rod 16 that is equal to the maximum return velocity of a press ram in which the gas spring 10 is used. For example, the predetermined or maximum return velocity of the gas spring piston rod may be two meters per second (2 m/s).

The shock collar 18 may be configured, constructed, and/or composed wherein for any piston rod return velocity in excess of the maximum return velocity of the press ram, the shock collar 18 will axially plastically deform or collapse to such an extent as to allow the piston rod 16 to be displaced axially relative to the guide and seal assembly 14 sufficiently to vent pressurized gas from the chamber 28 through and/or past the rod seal 48. For example, the piston rod 16 suddenly may extend freely during component failure of a retaining portion of a die in which the gas spring 10 is used, or when a portion of the die suddenly and unexpectedly slips or moves transversely away from the piston rod 16 during a compression stroke. In the event that the yield point of the shock collar 18 is exceeded in operation of the gas spring 10, a portion of the piston rod 16 will disrupt sealing engagement of the piston rod 16 with the rod seal 48 and thereby allow discharge of compressed gas past the rod seal 48.

For example, the piston rod 16 may travel to such an extent that the seal 48 at least partially disengages from the cylindrical outer surface 82 of the rod body 70 because of the annular relief 84 in the rod neck 78, wherein pressurized gas may be vented through the neck vent passage 90 and between the annular relief 84 and the rod seal 48 out of the gas spring 10. Accordingly, the compressed gas vents to the atmosphere between the rod seal 48 and the piston rod 16 so that the compressed gas cannot propel the piston rod 16 completely out of the casing 12.

In another example, the piston rod 16 may travel even further to such an extent that a portion of the piston rod neck 78 may rupture the rod seal 48 and/or the support ring 68 for the seal 48, wherein the neck vent 90 will communicate pressurized gas from the gas chamber 28 past the ruptured seal 48 and/or to the other side of the ruptured seal 48. More specifically, the annular projection 86 may rupture the rod seal 48 and or the support ring 68.

Moreover, the displacement and momentum of the piston rod 16 may be arrested by interference between the piston rod 16 and the guide and seal assembly 14. For example, a portion of the piston rod 16 may become embedded in corresponding portions of the guide and seal assembly 14 to further prevent the piston rod 16 from being propelled by the compressed gas completely out of the casing 12. More specifically, the annular projection 86 may become embedded in portions of the assembly 14.

Use of the guide bearing 104 and the length of the guide and seal assembly housing 44 permit relatively high piston rod velocities, e.g. 2 meters per second (m/s). In one example, a ratio of the combined engagement length of the housing bushing 46 and the piston bearing 104 to the inside diameter of casing 12 may be about 1:1. The gas spring 10 can be operated relatively safely at the greater velocities because the shock collar 18 allows the gas spring 10 to undergo higher impact forces associated with the greater impact velocities.

The gas spring 10 may be assembled in any suitable manner and its various components may be manufactured in any suitable manner and composed of any suitable materials. For example, the piston rod 16 may be turned, bored, drilled, and tapped from bar stock, may be forged and then machined, or for longer rods may be forged and welded to a slug to increase the length and then machined. In another example, the piston rod 16 may be composed of an alloy steel, may be heat treated, and may be ground to produce smooth finishes. In a further example, the shock collar 18 may be composed of low carbon steel and may be turned from tube stock, or may be composed of a spring steel alloy for higher deflection in the elastic region and less material volume, or of an aluminum tube for good energy dissipation in compression, or of a composite structure where shear planes fail, or of a roll formed tube having formed corrugations.

FIGS. 5 through 14 illustrate another presently preferred form of a gas spring 210 and its various components. This form is similar in many respects to the form of FIGS. 1 through 4 and like numerals between the forms generally designate like or corresponding elements throughout the several views of the drawing figures. Accordingly, the descriptions of the gas springs 10, 210 are incorporated into one another by reference in their entireties. Subject matter in common between the embodiments may or may not be repeated here.

Figures 5, 5A, 6A:
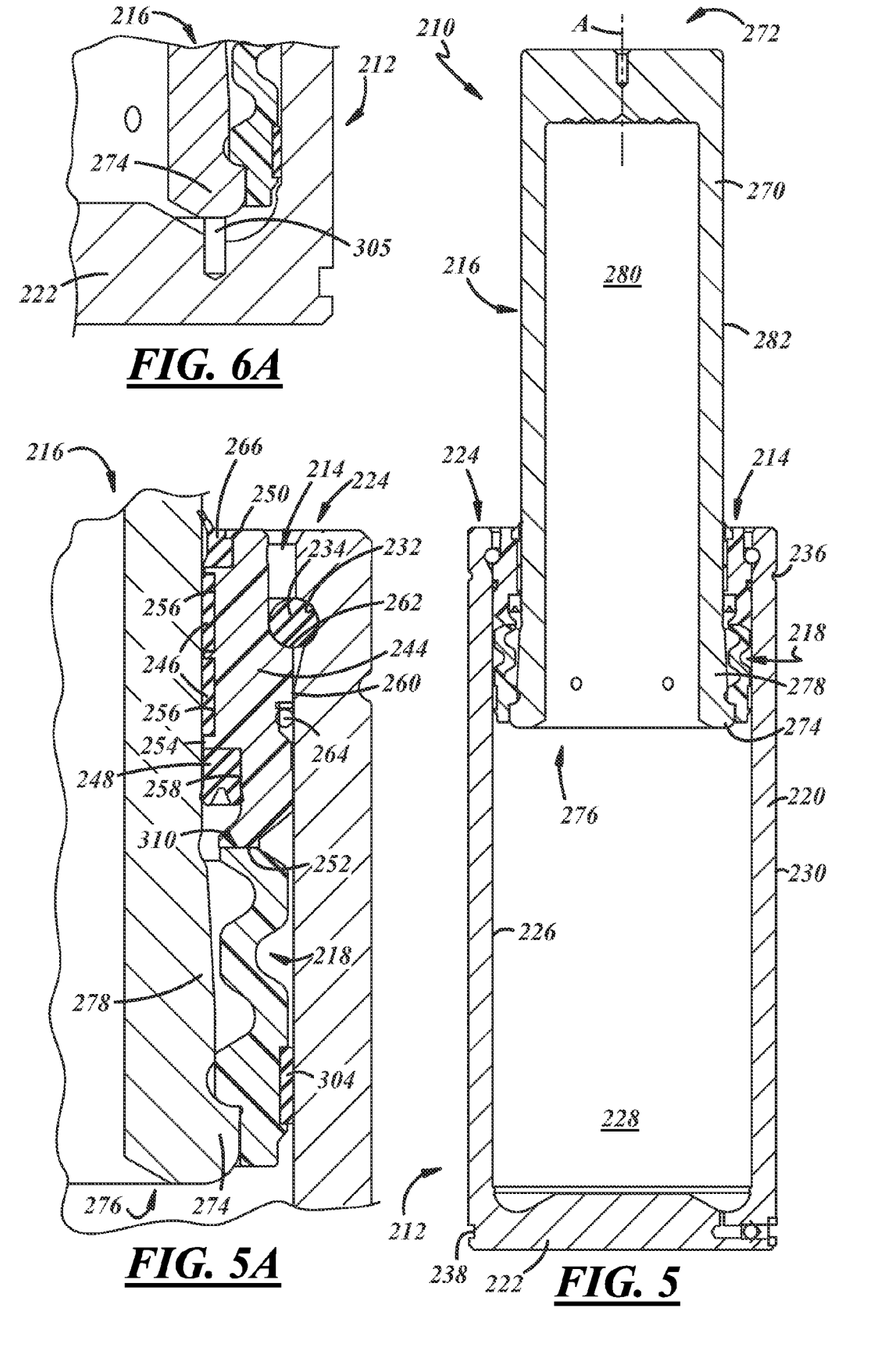
FIG. 5 a sectional view of another illustrative embodiment of a gas spring with a piston rod carrying a shock collar, and shown in its extended position.
FIG. 5A is an enlarged fragmentary sectional view of the gas spring of FIG. 5.
FIG. 6A is an enlarged fragmentary sectional view of the gas spring of FIG. 6.
Figures 6, 8:
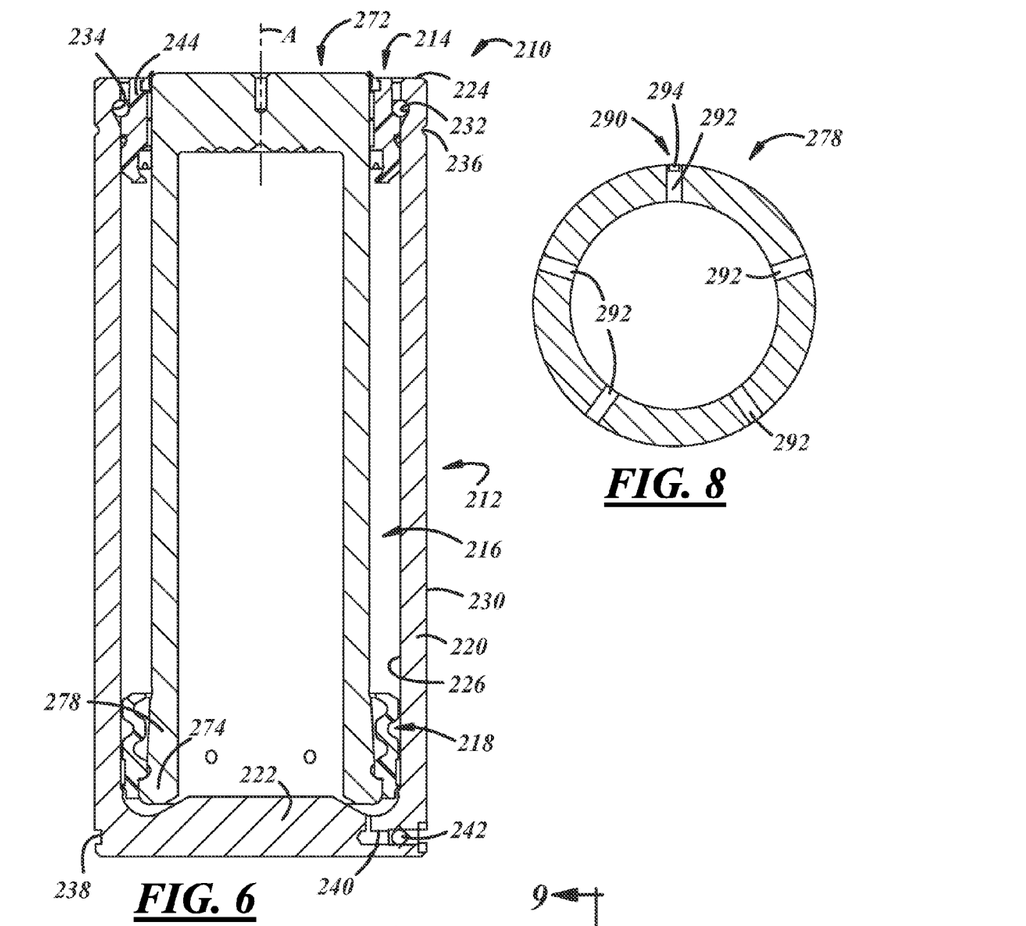
FIG. 6 is a view similar to FIG. 5 with the piston rod in its retracted position.
FIG. 8 is a sectional view of the piston rod taken through line 8-8 of FIG. 7.

In general, and with reference to FIGS. 5 through 6, the gas spring 210 may include a casing 212, a guide and seal assembly 214 carried by the casing 212, a piston rod 216 carried by the casing 212 and extending through the guide and seal assembly 214, and a shock absorbing collar or shock collar 218 carried by the piston rod 216.

The casing 212 may include a side wall 220 that may terminate axially at a closed end 222, and at an open end 224 that receives the guide and seal assembly 214 and the piston rod 216 therein. The closed end 222 may be a separate component coupled to the side wall 220, for example by a weld joint, or may be integrally produced with the side wall 220. The side wall 220 of the casing 212 has an inner surface 226 defining at least in part a gas chamber 228, and an outer surface 230. The casing 212 may be of generally cylindrical shape, for example, wherein at least one of the inner or outer surfaces 226, 230 is cylindrical. The inner surface 226 of the side wall 220 may have a circumferential retainer groove 232 (FIG. 5A) constructed for receipt of a retainer, shown here by way of example as a snap ring 234 (FIG. 5A), to maintain the gas spring 210 in its assembled state. To facilitate mounting and locating the gas spring 210 within a press, a pair of longitudinally spaced circumferential grooves 236, 238 may be machined, formed, or otherwise provided in the outer surface 230 of the casing 212 adjacent its ends 222, 224.

To admit gas into the gas spring 210, the casing 212 may include a passage or fill port 240 that may be provided through the closed end 222 of the casing 212 in any suitable manner A fill valve 242 may be received in the fill port 240, for instance, to act as a one way valve and allow gas to be admitted into the gas spring 210, while preventing the gas from unintentionally exiting the gas spring 210. The fill valve 242 may be opened to release pressurized gas from within the gas spring 210, when desired.

As shown in FIG. 6A, the closed end 222 of the casing 212 may carry one or more annular axial extensions 305 that may cooperate with the head 274 of the piston rod 216, for example, to limit travel of the piston rod 216.

Referring to FIG. 5A, the guide and seal assembly 214 is disposed at least in part in the casing 212 at the open end 224 of the casing 212, and includes a piston rod housing 244, guide bushings 246 carried by the housing 244, and a rod seal 248 carried by the housing 244. The housing 244 may include an outer axial end 250, an inner axial end 252, a piston rod through bore 254 extending between the ends 250, 252, bushing grooves 256 in the bore 254, a seal pocket 258 in the bore 254, and an outer surface 260. The housing 244 may be of generally cylindrical shape, for example, wherein the through bore 254 is of cylindrical profile and the outer surface 260 may be of cylindrical profile. The guide bushing 246 may be disposed in the bushing groove 256 of the housing 244, may be composed of any suitable low friction material, and may be sized to slidably engage the piston rod 216 to guide the piston rod 216 for axial reciprocation within the casing 212. The rod seal 248 may be disposed in the seal pocket 258 of the housing 244 and sealingly engages the piston rod 216.

The guide and seal assembly 214 may be sealingly coupled to the casing 212. For example, a shoulder 262 in the outer surface of the housing 244 may cooperate with the snap ring 234, and a casing seal 264 may be disposed between the housing 244 and the inner surface 226 of the casing 212, for instance, in a groove in the outer surface 260 of the housing 244. The assembly 214 also may include a wiper 266 that may be carried in a wiper groove of the through bore 254 at the outer axial end 250 of the housing 244.

Referring to FIGS. 5 and 6, the piston rod 216 is disposed at least in part in the casing 212 and through the guide and seal assembly 214 for reciprocation along an axis A between extended and retracted positions over a cycle of the gas spring 210 including a retraction stroke and an extension or return stroke. The piston rod 216 is acted on by gas in the gas chamber 224 to bias the piston rod 216 toward an extended position (FIG. 5) and away from a retracted position (FIG. 6).

The piston rod 216 includes a body 270 extending out of the casing 212 through the through bore 254 of the guide and seal assembly housing 244 and including a first or outer axial end 272 engageable with a ram or other portion of a die, press or other piece of forming equipment (not shown), a head 274 disposed in the casing 212 at a second or inner axial end 276 of the piston rod 216, and a neck 278 between the head 274 and the body 270. The piston rod 216 also includes an internal cavity 280 extending from the inner axial end 276 of the piston rod 216 toward the outer axial end 272 of the piston rod 216. The internal cavity 280 may be centrally radially located and may extend for larger than 80% of the overall length of the piston rod 216. The body 270 also includes a cylindrical outer surface 282 in contact with the rod seal 248 and with the piston rod bushing 246 for guided relative movement between the extended and retracted positions.

Figure 7:
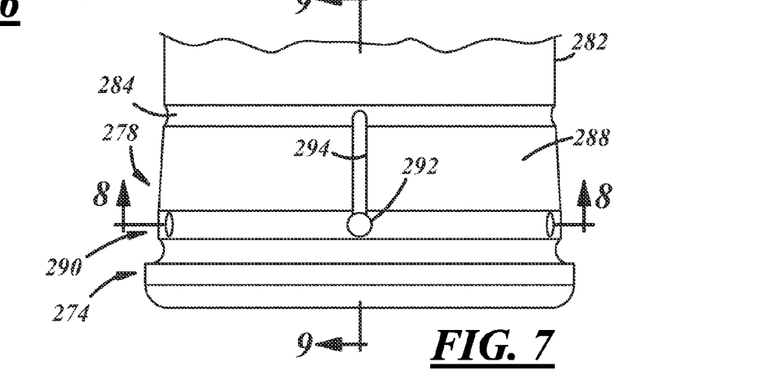
FIG. 7 is an enlarged fragmentary side view of a portion of the piston rod of FIGS. 5 and 6.
Figure 9:
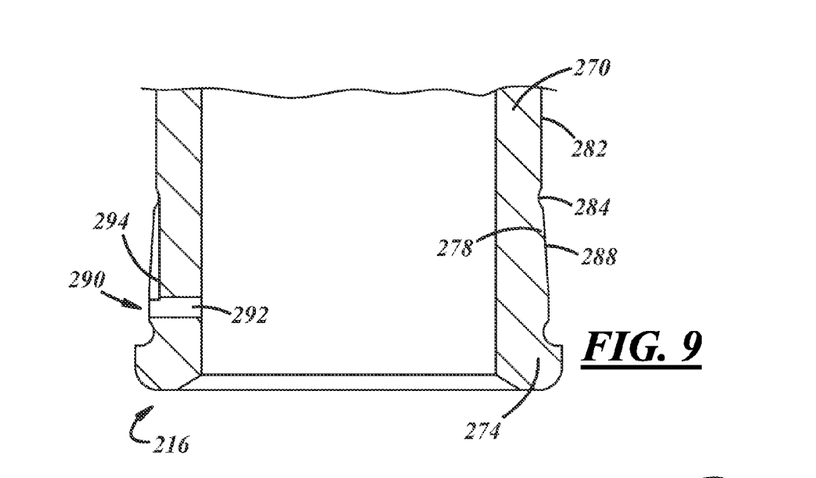
FIG. 9 is a sectional view of the piston rod taken through line 9-9 of FIG. 7.

Referring to FIGS. 7 through 9, the piston rod neck 278 includes a radially outer profile that may be larger in a radial direction relative to the piston rod body 270. Also, the head 274 may include a radially outer profile that may be cylindrical, and may be larger in a radial direction than the neck 278 and the cylindrical outer surface 282 of the body 270. The neck 278 may include an annular relief 284 axially adjacent the body 270, and a tapered outer surface 288 extending axially between the annular relief 284 and the head 274 and having an enlarged diameter relative to the cylindrical outer surface 282 of the body 270. The annular relief 284 is smaller in a radial direction than the cylindrical outer surface 282 of the body 270.

The piston rod neck 278 also may include one or more vent passages 290 extending through the piston rod 216 in a direction that is transverse with respect to the axis A, from the interior to the exterior thereof. The vent passage 290 may include a through bore 292, and a relief 294 in the exterior surface of the piston rod 216, for example, in the tapered outer surface 288. The vent passage 290 may be located so as to overlap with or intersect the annular relief 284. For example, the relief 294 may communicate with and interrupt the annular relief 284 as best shown in FIG. 7.

Figure 10:
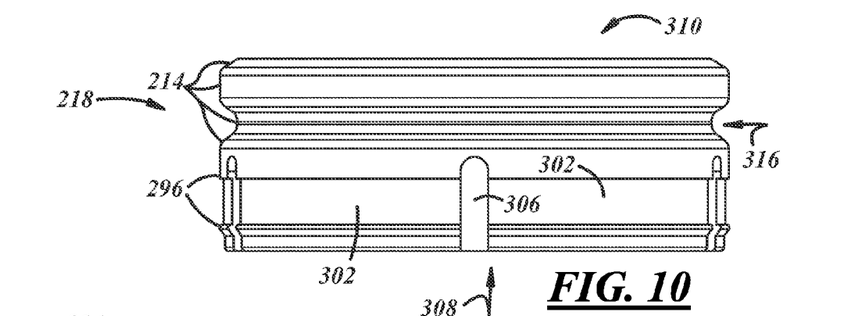
FIG. 10 is an enlarged side view of the shock collar of FIGS. 5 and 6.
Figure 11:
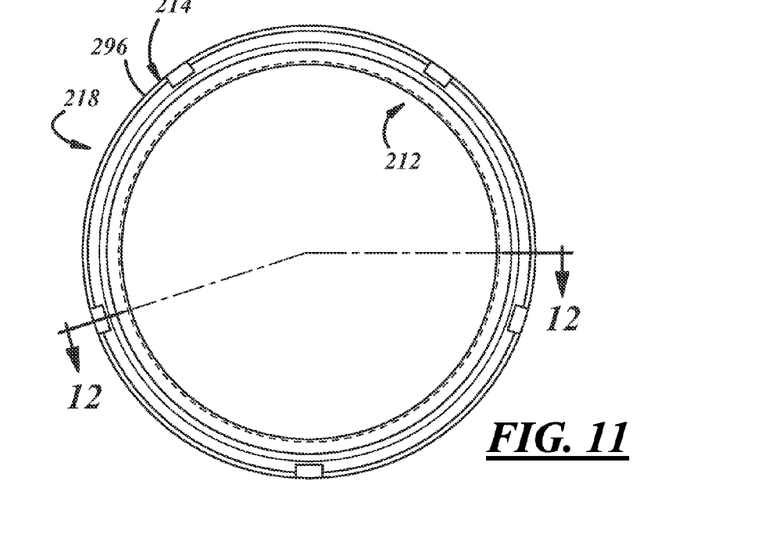
FIG. 11 is an enlarged end view of the shock collar of FIGS. 5 and 6.
Figure 12:
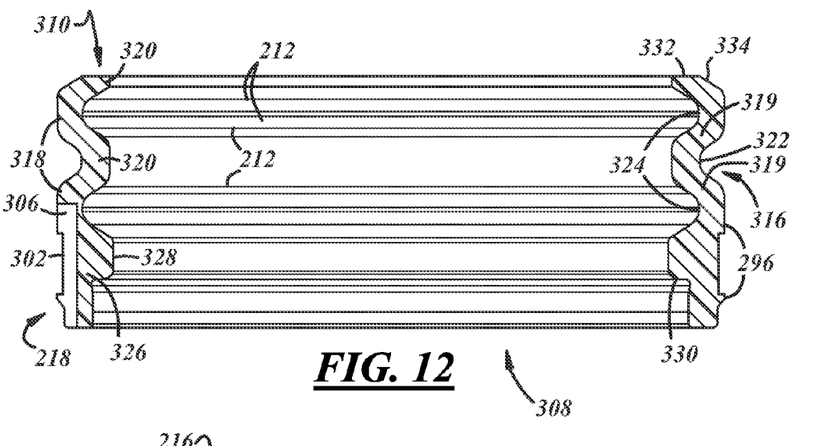
FIG. 12 is an enlarged sectional view of the shock collar taken through line 12-12 of FIG. 11.

Referring to FIGS. 10 through 12, the shock collar 218 may include a casing journal 296 having an enlarged diameter relative to the tapered outer surface 288 of the piston rod neck 278 (FIG. 9). The casing journal 296 may include a guide bearing groove 302 in which a guide bearing 304 (FIG. 5A) may be disposed for guiding the piston rod 216 within the casing 212. The shock collar 218 further may include one or more collar vents 306 that may extend axially through the guide bearing groove 302, for example, from a head end 308 of the collar 218 to a radially outer surface of the collar 218 as best shown in FIG. 12.

Referring to FIG. 10, the shock collar 218 may include the head end 308, which may contact a portion of the piston rod head 274 (FIG. 5A), and also may include the housing end 310, which may contact a corresponding axial end or surface of the guide and seal housing 244 (FIG. 5A). The shock collar 218 further may include a radially inner profile 212 (FIG. 11) surrounding the piston rod 216, and a radially outer profile 214 (FIG. 10) surrounded in assembly by the casing 212 (FIG. 5). The shock collar 218 may include a collapsible portion that may be flexible and is axially displaceable.

In one implementation, and with reference to FIG. 12, the collapsible portion of the shock collar 218 may be at least partially corrugated. For instance, the shock collar 218 may include a side wall 316, including at least a portion of which is corrugated. Corrugations may include one or more radially outer annular projections 318 and one or more radially inner annular projections 320 axially alternating with the radially outer annular projections 318. Accordingly, the inner projections 320 are axially spaced from the outer projections 318. The projections 318, 320 may be circumferentially continuous. The inner projections 320 may have rounded outer surfaces 322 and the outer projections 318 may have rounded inner surfaces 324. The rounded surfaces 322, 324 may provide generally transversely extending annular segments 319 interconnecting the axially adjacent inner and outer projections 318, 320. The projections 318, 320 may have any suitable cross-sectional shape.

Also, the side wall 316 may include a mounting portion that extends axially from the collapsible portion, at least partially establishes the radially outer profile of the shock collar 218, and also may include a cylindrical portion 326 at the head end 308 of the shock collar 218. The cylindrical portion 326 may include a radially inner mounting surface 328 that may be sized for an interference fit with the step 300 of the piston rod head 274 (FIG. 5), and also may include an axially facing mounting surface 330 adjacent the radially inner mounting surface 328 that may axially locate the shock collar 218 against the piston rod 216.

Referring to FIG. 12, the housing end 310 of the shock collar 218 may include an impact surface 332 and a radially outwardly adjacent angled surface 334 that may be angled in a direction that is radially outward and axially away toward end 308 and axially from the end 310. The angle may be of any suitable magnitude. For example, the angle may be about 33 degrees, for instance, from 15 to 45 degrees.

Referring to FIG. 5A, the shock collar 218 may surround a portion of the piston rod 216 at an axial location along the piston rod 216 between the head 274 and the housing 244 of the guide and seal assembly 214. The shock collar 218 may be axially spaced from the housing 244 in the retracted position of the piston rod 216 (FIG. 6), and may engage the housing 244 in the extended position of the piston rod 216 (FIG. 5).

For example, the housing end 310 of the shock collar 218 may engage the corresponding axial end 252 of the housing 244.

The shock collar 218 may be configured, constructed, and/or composed wherein for any piston rod return velocity in excess of the maximum return velocity of the press ram, the shock collar 218 will axially plastically deform or collapse to such an extent to allow the piston rod 216 to be displaced axially relative to the guide and seal assembly 214 so as to vent pressurized gas from the chamber 228 through and/or past the rod seal 248. In the event that the yield point of the shock collar 218 is exceeded in operation of the gas spring 210, a portion of the piston rod 216 will disrupt sealing engagement of the piston rod 216 with the rod seal 248 and thereby allow discharge of compressed gas past the rod seal 248.

Figure 13:
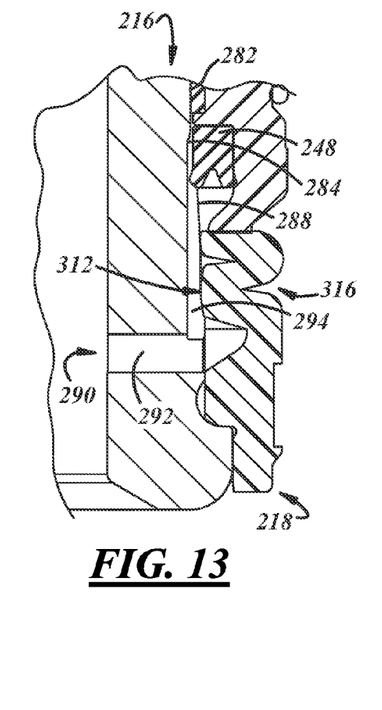
FIG. 13 is an enlarged fragmentary sectional view of a portion of the gas spring of FIG. 5, illustrating crushing of the shock collar.

For example, and with reference to FIG. 13, the piston rod 216 may travel to such an extent that the seal 248 at least partially disengages from the cylindrical outer surface 282 of the rod body 270 because of the annular relief 284 in the rod neck 278 and/or the relief 294, wherein pressurized gas may be vented through the neck vent passage 290 and between the annular relief 284 and the rod seal 248 out of the gas spring 210. Accordingly, the compressed gas vents to the atmosphere between the rod seal 248 and the piston rod 216 so that the compressed gas cannot propel the piston rod 216 completely out of the casing 212 (FIG. 5). The size, shape, and configuration of the vent passage 290 may be used to determine gas flow to influence the time of gas discharge during shock collar collapse under abnormal operating conditions, and to influence heating/cooling during normal operation.

Figure 14:
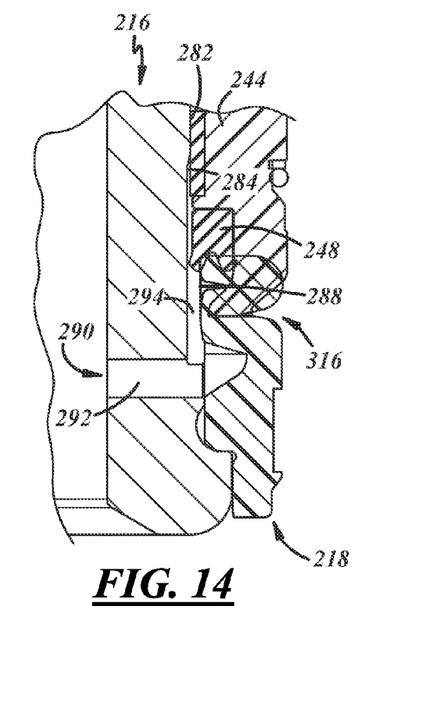
FIG. 14 is a view similar to that of FIG. 13, illustrating further crushing of the shock collar.

In another example, and with reference to FIG. 14, the piston rod 216 may travel even further to such an extent that a portion of the piston rod neck 278 may rupture the rod seal 248, wherein the neck vent 290 will communicate pressurized gas from the gas chamber 228 past the ruptured seal 248 and/or to the other side of the ruptured seal 248. More specifically, the tapered outer surface 288 may rupture the rod seal 248.

Moreover, the displacement and momentum of the piston rod 216 may be arrested by interference between the piston rod 216 and the guide and seal assembly 214. For example, a portion of the piston rod 216 may become embedded in corresponding portions of the guide and seal assembly 214 to further prevent the piston rod 216 from being propelled by the compressed gas completely out of the casing 212. More specifically, the tapered outer surface 288 may become embedded in portions of the assembly 214, for example, interior surfaces of the housing 244. The size, shape, and configuration of the surface 288 may be used to establish a crush length of the shock collar 218 and the concomitant dissipation of energy.

The gas spring 210 may be assembled in any suitable manner and its various components may be manufactured in any suitable manner and composed of any suitable materials. For example, the piston rod 216 may be turned, bored, drilled, and tapped from bar stock, may be forged and then machined, or for longer rods may be forged and welded to a slug to increase the length and then machined. In another example, the piston rod 216 may be composed of an alloy steel, may be heat treated, and may be ground to produce smooth finishes. In a further example, the shock collar 218 may be composed of a low carbon steel and may be turned from tube stock.

It should be appreciated that one ordinarily skilled in the art will recognize other embodiments encompassed within the scope of this invention. The plurality of arrangements shown and described above are merely illustrative and not a complete or exhaustive list or representation. Of course, still other embodiments and implementations can be achieved in view of this disclosure. The embodiments described above are intended to be illustrative and not limiting. The scope of the invention is defined by the claims that follow.

The invention claimed is:

1. A gas spring for forming equipment, comprising:
a casing;
a piston rod housing received at least in part in the casing;
a piston rod received at least in part in the casing and extending through the piston rod housing for reciprocation between extended and retracted positions over a cycle of the gas spring including a retraction stroke and an extension stroke, and including a body having a cylindrical outer surface extending out of the casing through the piston rod housing and having an outer axial end of the piston rod disposed outside of the casing, and a head adjacent an inner axial end of the piston rod;
a shock collar carried by the piston rod at an axial location along the piston rod between the piston rod head and the piston rod housing, wherein the shock collar surrounds a portion of the piston rod, is axially spaced from the piston rod housing in the retracted position of the piston rod, and engages the piston rod housing in the extended position of the piston rod, and wherein the shock collar includes a collapsible portion that is flexible and axially displaceable, and a mounting portion extending axially from the collapsible portion and mounted to the piston rod;
a piston rod seal carried by the piston rod housing and normally in sealing engagement with the cylindrical outer surface of the piston rod;
an annular relief in the cylindrical outer surface of the piston rod and adjacent the collar;
a vent passage in the piston rod and communicating with the annular relief; and
when the piston rod exceeds a predetermined velocity during the extension stroke, the collapsible portion of the shock collar axially collapses between the piston rod head and the piston rod housing to such an extent that the annular relief in the cylindrical outer surface of the piston rod interrupts the sealing engagement of the piston rod seal with the piston rod and thereby allows discharge of compressed gas past the piston rod housing.

2. The gas spring of claim 1, further comprising a piston guide bearing carried by the head of the piston rod.

3. The gas spring of claim 1, further comprising a piston guide bearing carried by the shock collar.

4. The gas spring of claim 1, further comprising:
a guide and seal assembly received at least in part in the casing, sealingly coupled to the casing, and including:
the piston rod housing having a piston rod through bore,
a guide bushing carried by the housing in the through bore, and
the rod seal carried by the housing;
the cylindrical outer surface of the piston rod is in sliding engagement with the piston rod bushing for guided relative movement between the extended and retracted positions;
the piston rod head having a radially outer profile radially larger than the cylindrical outer surface of the body; and
the piston rod having a neck disposed axially between the head and the body and having a radially outer profile radially larger than the cylindrical outer surface of the body.

5. The gas spring of claim 4, wherein upon the piston rod exceeding a predetermined velocity during the extension stroke, the collapsible portion collapses in an axial direction between the piston rod head and the guide assembly housing to permit a portion of the piston rod to disrupt sealing engagement of the piston rod with the piston rod seal and thereby allow discharge of compressed gas past the guide assembly seal.

6. The gas spring of claim 4, wherein the piston rod neck also includes:
an annular projection axially adjacent the annular relief,
a cylindrical collar journal extending axially between the projection and the piston rod head and having an enlarged diameter relative to the cylindrical outer surface of the body,
the vent passage extending through the piston rod from the interior to the exterior thereof and overlapping the annular relief.

7. The gas spring of claim 6, wherein the piston rod head includes:
a casing journal having an enlarged diameter relative to the collar journal of the piston rod neck, and a guide bearing groove;
a fillet between the casing journal and collar journal, and
a head vent extending through the fillet.

8. The gas spring of claim 7, wherein the piston rod head also includes an annular axial extension that cooperates with a closed end of the casing.

9. The gas spring of claim 4, wherein the piston rod neck also includes:
a tapered outer surface extending axially between the annular relief and the piston rod head and having an enlarged diameter relative to the cylindrical outer surface of the body, and
the vent passage extending through the piston rod from the interior to the exterior thereof and overlapping the annular relief.

10. The gas spring of claim 9, wherein the shock collar also includes:
a casing journal having an enlarged diameter relative to the tapered outer surface of the piston rod neck, and a guide bearing groove; and
a head vent extending through the guide bearing groove.

11. The gas spring of claim 1 wherein the collapsible portion of the shock collar has an impact surface, and corrugations including axially alternating annular projections including at least one radially outer annular projection at least partially establishing a radially outer profile of the shock collar and at least one radially inner annular projection at least partially establishing a radially inner profile of the shock collar; and
the mounting portion at least partially establishing the radially outer profile of the shock collar, and including a radially inner mounting surface and an axially facing mounting surface adjacent the radially inner mounting surface.

12. The gas spring of claim 11, wherein the shock collar has a bearing groove in the radially outer profile for carrying a gas spring piston bearing.

13. The gas spring of claim 11, wherein the axially facing surface of the mounting portion is an axial shoulder between the radially inner mounting surface and the collapsible portion.

14. The gas spring of claim 11, wherein the axially facing surface of the mounting portion is axially opposite the impact surface of the corrugated portion.

15. A gas spring piston rod, comprising:
a body including a first end of the piston rod, and having a cylindrical outer surface;
a head disposed at a second end of the piston rod, and having a radially outer profile radially larger than the cylindrical outer surface of the body; and
a neck axially disposed between the body and the head, and having:
a radially outer profile radially larger than the cylindrical outer surface of the body,
an annular relief axially adjacent the radially outer surface of the body, wherein the annular relief is radially smaller than the cylindrical outer surface of the body, and
at least one vent passage extending transversely through the piston rod and intersecting the annular relief.

16. The gas spring piston rod of claim 15, wherein the neck also has an annular projection axially adjacent the annular relief, and a cylindrical collar journal axially between the annular projection and the head.

17. The gas spring of claim 4, wherein the neck also has a tapered outer surface axially between the annular relief and the head.

18. A gas spring for forming equipment, including the piston rod of claim 15.

19. The gas spring of claim 18, further comprising a shock collar carried by the piston rod and including:
a collapsible portion having an impact surface, and corrugations including axially alternating annular projections including at least one radially outer annular projection at least partially establishing a radially outer profile of the shock collar and at least one radially inner annular projection at least partially establishing a radially inner profile of the shock collar; and
a mounting portion extending axially from the collapsible portion, at least partially establishing the radially outer profile of the shock collar, and including a radially inner mounting surface and an axially facing mounting surface adjacent the radially inner mounting surface.

* * * * *